United States Patent
Smith

(10) Patent No.: US 8,220,660 B2
(45) Date of Patent: Jul. 17, 2012

(54) SYSTEMS AND METHODS FOR SUPPLYING AND/OR DISPENSING FLUID

(76) Inventor: Clyde M. Smith, Nashville, TN (US)

( * ) Notice: Subject to any disclaimer, the term of this patent is extended or adjusted under 35 U.S.C. 154(b) by 1099 days.

(21) Appl. No.: 12/152,378

(22) Filed: May 14, 2008

(65) Prior Publication Data

US 2008/0314452 A1 Dec. 25, 2008

Related U.S. Application Data

(60) Provisional application No. 60/930,068, filed on May 14, 2007.

(51) Int. Cl.
*B67D 1/00* (2006.01)

(52) U.S. Cl. ...... 222/57; 222/71; 222/129.2; 222/129.4; 222/132; 222/145.5; 222/148; 222/250; 137/101.19; 239/533.4

(58) Field of Classification Search ................ 222/1, 52, 222/57, 71, 129, 129.2–129.4, 134–137, 222/249–250, 145.5, 336, 148, 146.6, 132, 222/334; 137/3, 101.19, 101.21, 98; 239/1, 239/533.4

See application file for complete search history.

(56) References Cited

U.S. PATENT DOCUMENTS

| | | | |
|---|---|---|---|
| 2,367,135 A | 1/1945 | Moon et al. | |
| 3,549,048 A * | 12/1970 | Goodman | 222/57 |
| 3,770,060 A | 11/1973 | Forsyth et al. | |
| 3,831,849 A | 8/1974 | Studinger | |
| 3,910,497 A | 10/1975 | Manor | |
| 4,209,343 A * | 6/1980 | Lane et al. | 134/22.12 |
| 4,236,673 A | 12/1980 | Lake | |
| 4,244,494 A * | 1/1981 | Colgate et al. | 222/1 |
| 4,341,327 A | 7/1982 | Zeitz | |
| 4,392,508 A * | 7/1983 | Switall | 137/99 |
| 4,427,298 A | 1/1984 | Fahy et al. | |
| 4,487,333 A | 12/1984 | Pounder et al. | |
| 4,593,855 A | 6/1986 | Forsyth | |
| 4,609,149 A | 9/1986 | Jessen | |
| 4,638,924 A | 1/1987 | Newsom | |
| 4,821,958 A | 4/1989 | Shaffer | |
| 5,100,058 A | 3/1992 | Wei | |
| 5,118,008 A | 6/1992 | Williams | |
| 5,143,257 A * | 9/1992 | Austin et al. | 222/57 |
| 5,180,108 A | 1/1993 | Miyamoto | |
| 5,246,026 A * | 9/1993 | Proudman | 137/3 |
| 5,255,819 A | 10/1993 | Peckels | |
| 5,303,866 A | 4/1994 | Hawks, Jr. | |
| 5,368,059 A | 11/1994 | Box et al. | |
| 5,383,605 A | 1/1995 | Teague | |
| 5,636,648 A | 6/1997 | O'Brien et al. | |
| 5,921,263 A * | 7/1999 | Negley, III | 137/3 |
| 6,164,560 A | 12/2000 | Lehrke et al. | |
| 6,253,779 B1 * | 7/2001 | Nanaji et al. | 137/3 |
| 6,314,979 B1 * | 11/2001 | Lips | 137/3 |
| 6,568,559 B2 | 5/2003 | Miller et al. | |

* cited by examiner

*Primary Examiner* — Frederick C. Nicolas

(74) *Attorney, Agent, or Firm* — Finnegan, Henderson, Farabow, Garrett & Dunner, L.L.P.

(57) ABSTRACT

A system for supplying at least two fluids in proportioned quantities may include a first and second intake passages configured to be in flow communication with sources of first and second fluids, respectively. The system may include a fluid transfer device in flow communication with the first intake passage and the second intake passage, and a pump in flow communication with the first intake passage. Operation of the pump is configured to supply a quantity of the first fluid to a first chamber of the fluid transfer device such that a quantity of the second fluid is expelled from a second chamber of the fluid transfer device. When operation of the pump is ceased, a quantity of the second fluid enters the second chamber and a quantity of the first fluid is expelled from the first chamber.

46 Claims, 6 Drawing Sheets

SYSTEMS AND METHODS FOR SUPPLYING AND/OR DISPENSING FLUID

RELATED APPLICATION

This application claims the benefit of priority under 35 U.S.C. §119(e) of U.S. Provisional Application No. 60/930,068, filed on May 14, 2007, the disclosure of which is incorporated herein by reference.

FIELD OF THE DISCLOSURE

The present disclosure relates generally to systems and methods for supplying fluid, and more particularly, the present disclosure relates to systems and methods for supplying fluid in proportioned amounts and amplifying fluid supply.

BACKGROUND

Many useful machines may have the ability to combine and deliver two or more proportioned fluids. Common examples include post-mix beverage dispensers, frozen drink dispensers, mosquito control sprayers, commercial laundry equipment, pool chlorinators, and clean diesel, selective catalytic reduction (SCR) systems. The users and manufacturers of such machines may desire simpler, less costly, more reliable, more maintainable, and/or proportioning systems and subsystems having longer service lives.

Some existing dispensers may use a type of continuous proportioning system with known and established flow rates. For example, two methods may be used to achieve a known flow rate. A first method maintains a fluid under constant pressure passing through a fixed restriction, such as an orifice. A variation of this method includes a fluid of relatively constant pressure passing through a pressure-compensated orifice. An example of a dispensing system using such a method is a post-mix beverage dispenser found in restaurants. A second method uses a volumetric pump (i.e., a positive displacement pump) turned by a motor running at a fixed rotational speed. A variation of this method uses a variable speed motor responsive to a feedback loop. Dispensing systems may use either of these two methods. Additionally, some dispensing systems may combine the two methods.

Such methods, however, may suffer from a number of possible drawbacks. For example, such methods may require relatively complex and/or more expensive systems. Moreover, such methods may require systems that are difficult to maintain, and/or such systems may have shorter than desired service lives.

One subject of the present disclosure may be to provide a single action device that may convert a pulse of a first fluid flow and pressure into mechanical motion via a fluid motor part of the device, such that using such mechanical motion may convert it into a pulse of a second fluid flow and pressure via a fluid pump part of the device. A further subject of the present disclosure may be to provide a pulse proportioning in a dispenser array. Yet another subject of the present disclosure may be to provide pulse proportioning multiplexed in a dispenser array. Still a further subject of the present disclosure may be to provide pulse proportioning of multiple second fluids, such as, for example, ingredients, constituents, and/or additives.

Another subject of the disclosure may be to provide pulse proportioning into a single dispense. A further subject of the disclosure may be to provide pulse proportioning into a single batch for multiple dispenses.

Yet another subject of the present disclosure may be to provide pulse proportioning where a first fluid volume is controlled by time. Still another subject of the present disclosure may be to provide pulse proportioning where a first fluid volume is controlled by a level switch. Another subject of the present disclosure may be to provide pulse proportioning where a first fluid volume is controlled by a flow totalizer.

A further subject of the present disclosure may be to provide pulse proportioning with an air gap pulser. Still a further subject of the present disclosure may be to provide pulse proportioning with an amplified pulser. Yet another subject of the present disclosure may be to provide pulse proportioning with a partially, hydraulically-balanced pulser. Still a further subject of the present disclosure may be to provide pulse proportioning with a pulser for two or more fluids, where one or more fluids may be pulsed by a double acting pump.

Another subject of the present disclosure may be to provide pulse proportioning with an adjustable volume pulser. A further subject of the present disclosure may be to provide a system controller that adjusts a first fluid powering pulse width to compensate for flow rate lost by a positive displacement pump due to wear. Yet another subject of the present disclosure may be to provide a device capable of sensing a reciprocating motion for control and measurement purposes. Still a further subject of the present disclosure may be to provide fluid circuits capable of delivering multiple fluids from multiple sources to multiple destinations.

Additional subjects and advantages of the disclosure will be set forth in part in the description which follows, and in part will be obvious from the description, or may be learned by practice of the disclosed exemplary embodiments.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a system for supplying at least two fluids in proportioned quantities. The system may include a first intake passage configured to be in flow communication with a source of a first fluid and a second intake passage configured to be in flow communication with a source of a second fluid. The system may further include a fluid transfer device in flow communication with the first intake passage and the second intake passage, and a pump in flow communication with the first intake passage. The pump may be configured to transfer the first fluid via the first intake passage to the fluid transfer device. The fluid transfer device may include a first chamber and a second chamber, the first intake passage may be in flow communication with the first chamber, and the second intake passage may be in flow communication with the second chamber. Operation of the pump may be configured to supply a quantity of the first fluid to the first chamber such that a quantity of the second fluid is expelled from the second chamber, and when operation of the pump is ceased, a quantity of the second fluid enters the second chamber and a quantity of the first fluid is expelled from the first chamber.

According to another aspect, a fluid flow amplification system may include a first intake passage configured to be in flow communication with a source of a fluid, and a second intake passage configured to be in flow communication with the source of a fluid. The system may further include a fluid transfer device in flow communication with the first intake passage and the second intake passage. The fluid transfer device may include a first chamber and a second chamber. The system may also include a pump in flow communication with the first intake passage and the second intake passage. The pump may be configured to transfer the fluid via the first and second intake passages to the fluid transfer device at a first pressure, wherein the first intake passage is in flow communication with the first chamber and the second intake passage is in flow communication with the second chamber. Operation of the pump may be configured to supply a quantity of the fluid to the first chamber such that a quantity of the fluid is expelled from the second chamber at a pressure greater than the first pressure.

According still a further aspect, method for dispensing a fluid may include pulsing a first fluid such that a first volume of the first fluid flows. The method may further include causing a second volume of a second fluid to flow in response to the pulsing of the first fluid, wherein the first volume is proportional to the second volume.

According to yet another aspect, a fluid transfer device may include a housing and a reciprocating piston in the housing. The piston and the housing may be configured to at least partially define at least two variable-volume chambers. The two chambers may be in a state of fluid isolation, for example, such that fluid in one of the chambers does not enter into any other chamber. According to another aspect, distinct inlet chamber and outlet chamber ports may be associated with at least one chamber. According to some aspects, one chamber may serve as a motor receiving a pressure pulse from a first powering fluid. At least one chamber may serve as a pump coupled to the motor.

In still a further aspect, the flow of a first powering fluid of known volume may create a pressure pulse that causes the flow of a second fluid of known volume. For example, the period of flow may be defined as a pulse cycle. The number, length, and/or frequency of pulse cycles may be responsive to a machine's state.

In a further aspect, some exemplary devices of the present disclosure may be used as a fluid motor coupled to a fluid pump. For example, the flow and pressure of a first fluid through a reciprocating piston fluid motor mechanically coupled to a reciprocating fluid pump may cause a flow and pressure of a second fluid in a predetermined ratio. The flow and/or pressure of the first fluid may not necessarily be the same as the flow and/or pressure of the second fluid. One or more fluids may be pumped by a fluid motor.

In another aspect, a device of the present disclosure may have utility for a variety of diverse applications including, but not limited to, proportioning, sampling, metering, detecting flow, recovering energy, intensifying pressure, and pumping. Exemplary devices of the present disclosure may reduce cost, improve performance, simplify construction and/or operation, and use preferable materials. According to another aspect, for example, two or more streams of liquid and/or gas may be proportioned, where one stream may have a source pressure higher than its destination pressure and may serve as an energy source to operate a reciprocating motor. The other streams may have a source pressure lower than their destination pressure and may use a pump powered by a motor to provide pressure and/or proportioning. According to yet another aspect, the device may be part of a larger system where additional fluids are added upstream and/or downstream, for example, using other systems.

According to a further aspect, a system of the present disclosure may be used in pollution control, for example, where a fluid pumped or maintained under pressure includes a urea-water solution for use in selective catalytic reduction diesel exhaust treatment for $NO_x$ reduction. According to another aspect, the system may function as a fluid amplifier or intensifier.

According other aspects, systems of the present disclosure may be used in dispensing applications, for example, where two or more fluids are mixed in a predetermined adjustable or non-adjustable ratio. Examples include diluting and mixing herbicides and pesticides into water for agricultural spraying, diluting and mixing fertilizer into irrigation water for agricultural and horticultural use, diluting and mixing soap concentrate into water for washing equipment for clothes, dishes, parts and the like, diluting and mixing an oil concentrate into water for machine tool lubrication, for the addition of chemical into the make-up water of process tanks, and for the diluting and mixing a syrup into a beverage. Such a dispensing system might not preclude adding other components via other systems, either upstream or downstream of a proportioning pump, regardless of whether the other components are liquid, gas, and/or solid. According to some aspects, systems of the present disclosure may function in this application by, for example, using the flow and pressure of the water as the first fluid for a fluid motor. An additive fluid as the second fluid may be pumped by a fluid pump in a ratio proportional to the volume of the pump pulse compared to the volume of the first fluid. Thereafter, both the first and the second fluid may be mixed together.

In some aspects, systems of the present disclosure may be used in applications, for example, where two or more fluids are mixed in a selectable, adjustable, and/or non-adjustable ratio. For example, a system may include a fluid motor driving multiple fluid pumps, where the pumps are selectably operable. A pump may be made selectably operable by, for example, closing a pump's discharge with a valve, thereby diverting the flow through a relief valve. For example, a relief valve may be internal or external to its pump. In the case of an internal relief valve, the flow may be diverted upon reaching a relieving pressure from pump outlet to inlet. Alternatively, a pump may be made selectably operable by a diverting valve returning a pumped fluid from its downstream side to its upstream side.

According to other aspects, some systems may include a fluid motor driving a fluid pump, where two or more second fluids are selectable. The selectable second fluids communicate with an inlet of a pump, and each fluid communication is interruptible by an independent valve, preferably a solenoid-operated valve. A pump may separately pulse individual second fluids via a controller, for example, by allowing or disallowing flow communication. According to some systems, a system may allow an adjustable ratio by including a fluid motor driving a pump, where the pump includes a stroke limiter, such as an adjusting screw that provides a stop for a piston. Some systems may allow an adjustable ratio, including a fluid motor driving a pump, where the number of pulses that constitutes a batch may be varied by a controller responsive to information input, such as may be achieved with a keypad interface, bar code scan, and/or RF signal. According to another aspect, such exemplary systems may be combined to achieve a specific operational result.

According to still a further aspect, some systems of the present disclosure may be used in sampling applications. For example, in some systems, the fluid to be sampled may power a fluid motor. A fluid pump may draw some of the discharge fluid of the fluid motor as a second fluid. The flow from the fluid pump may be the sample.

According to another aspect, the systems and devices of the present disclosure may be used for beverage dispensing. For example, by using a timed, pressurized flow of water from a volumetric pump (e.g., a positive displacement pump, rotary vane pump, model PA301X, made by Fluid-o-Tech) driven by a constant speed induction motor (e.g., a 1/3 horsepower NEMA 48YZ motor), a powering first fluid of known volume may be created. When a first fluid is used to actuate a pulse motor-pump that pumps a second fluid (e.g., a syrup) of known volume, then a beverage of acceptable ratio composed of water and syrup may be created. If a beverage is to be dispensed from such a pulse cycle, then a constant flow and flow rate of the first and second fluids may be coordinated to start and end at the same time. According to another aspect, instantaneous ratio control may be obtained if a first and second fluid are first mixed in, for example, an accumulator prior to dispensing. In the case of, for example, a carbonated soft drink, an accumulator may be a carbonator that receives a first fluid (e.g., water), a second fluid (e.g., syrup), and a third fluid (e.g., gaseous carbon dioxide) independently, which communicates with a dispensing faucet. In the case of a frozen drink, for example, an accumulator may include a freezer apparatus such as a freezing barrel that receives a first fluid (e.g., water), a second fluid (e.g., syrup), and optionally, a third fluid (e.g., gaseous carbon dioxide) independently, which communicates with a dispensing faucet.

According to some aspects, it may be desirable to increase the pulse frequency. In such a case, it may be desirable to use a motor technology capable of frequent starts and stops. Such a motor may be integrated with, for example, a positive displacement, rotary vane pump, for example, in the TMFR series of integrated pump-motor-controller units made by Fluid-o-Tech. According to a further aspect, it may be possible to create a pulse without stopping a volumetric pump, for example, by momentarily diverting a first powering fluid.

Aside from the structural and procedural arrangements set forth above, the embodiments could include a number of other arrangements, such as those explained hereinafter. It is to be understood that both the foregoing general description and the following detailed description are exemplary only.

BRIEF DESCRIPTION OF THE DRAWINGS

The accompanying drawings, which are incorporated in and constitute a part of this specification, illustrate several exemplary embodiments and, together with the description, serve to explain some principles of the embodiments.

DESCRIPTION OF EXEMPLARY EMBODIMENTS

Figure 1:
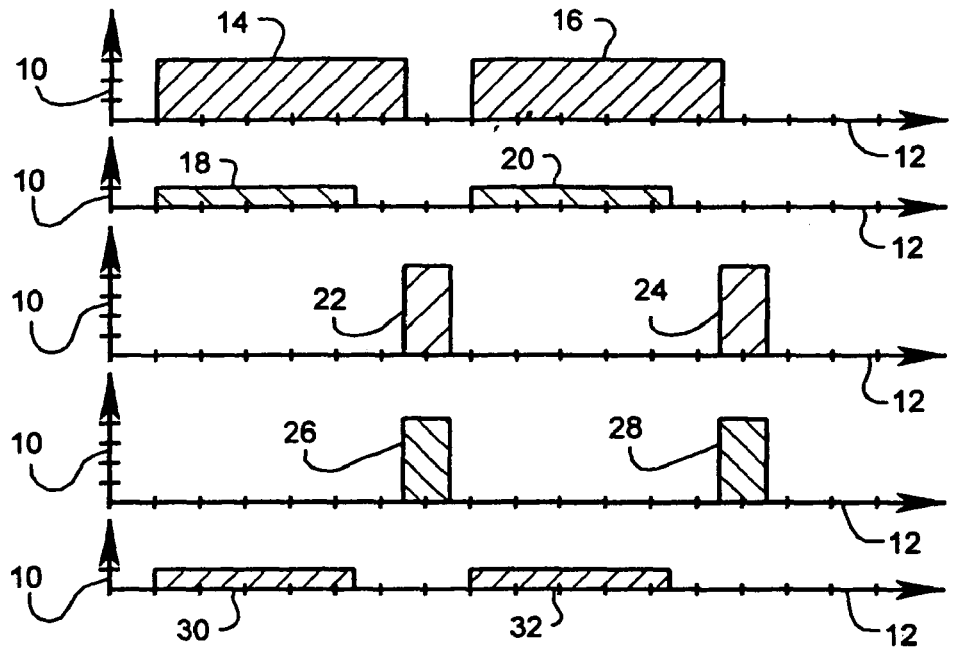
FIG. 1 is a bar graph representation of exemplary fluid flows versus time according to exemplary embodiments of systems and methods disclosed herein.

Reference will now be made in detail to exemplary embodiments. Wherever possible, the same reference numbers are used in the drawings and description to refer to the same or like parts.

According to some embodiments, a system for supplying fluids may operate based on a principle relating to pulse cycles. For example, such systems may include a first fluid (e.g., a powering fluid), a diluent, and a second pumped fluid, such as, for example, a concentrate, that are to be mixed and dispensed. According to some embodiments, there may be a third and/or a fourth pumped fluid, such as, for example, additional concentrates.

FIG. 1 includes an exemplary graphical representation describing the amplitude, time, and sequences of two pulse cycles. Flow rate is depicted on the vertical axis 10 (y-axis), and time is depicted on the horizontal axis 12 (x-axis). In the example depicted, a pulse 14 and a pulse 16 have a flow rate of 3.0 units and a time period of 5.5 units, as measured at, for example, point 72 in FIG. 2. Pulse 14 and pulse 16 may represent volumes of a first fluid (e.g., a powering fluid). A pulse 18 and a pulse 20 have a flow rate of 1.0 unit and a time period of 4.5 units, as measured at, for example, point 58 in FIG. 2. Pulse 18 and pulse 20 may represent volumes of a second pumped fluid exiting a fluid transfer device (e.g., a pulse proportioning device). A pulse 22 and a pulse 24 may represent volumes of a second pumped fluid entering a fluid transfer device. Pulse 22 and pulse 24 have a flow rate of 4.5 units and a time period of 1.0 unit, as measured, for example, at point 50 in FIG. 2. A pulse 26 and a pulse 28 may represent volumes of a first fluid (e.g. a powering fluid) exiting a fluid transfer device. Pulse 26 and pulse 28 have a flow rate of 4.5 units and a time period of 1.0 unit, as measured at, for example, point 68 in FIG. 2. A pulse 30 and a pulse 32 may represent volumes of a first fluid entering a fluid transfer device. Pulse 30 and pulse 32 have a flow rate of 1.0 unit and a time period of 4.5 units, as measured, for example, at point 68 in FIG. 2. Pulse 14 and pulse 16 may be independent pulses. Pulses 18, 20, 22, 24, 26, 28, 30, and 32 may be dependent pulses. A pulse cycle is the time period between about the beginning of pulse 14 and about the beginning of pulse 16. Pulses beginning with pulse 14 and pulse 16 may identically repeat, although this need not be the case.

According to some embodiments, depending on the objectives of the system, a pulse flow rate, pulse time period, and/or pulse cycle time may vary. For example, pulse 14 may be lengthened to compensate for reduced flow rate. Such a condition may arise due, for example, to wear of a positive displacement pump as its hours of service increase. According to some embodiments, a system may include a controller (not shown), and the system controller may respond by lengthening a duration of the pulse in a preprogrammed way. According to some embodiments, a system controller may respond by lengthening a pulse duration in response to a sampled signal input, such as, for example, a measured pressure drop across an orifice.

According to some embodiments and as shown in FIG. 1, pulse 14 initiates pulse 18 and pulse 30, with all pulses beginning at substantially the same time. The duration of pulse 18 and pulse 30 may be less than or equal to the duration of pulse 14, but (at least in some instances) not greater. According to the exemplary embodiment shown, pulse 14 initiates pulse 22 and pulse 26, with pulse 22 and pulse 26 beginning at the end of pulse 14. Pulse 22 and pulse 26 may be equal to or less than a time interval between an end of pulse 14 and a beginning of pulse 16, but (at least in some instances) not longer. A portion of pulse 14 may be used by a fluid transfer device (e.g., a pulse proportioning device) as a power source and may correspond to a portion of a volume of pulse 30. Pulse 32 may likewise be a portion of pulse 16. Pulse 26 and pulse 28 correspond to volumes of a second pumped fluid entering a fluid transfer device.

Upon termination of pulse 14, a portion of pulse 14 (i.e., pulse 26) used by a fluid transfer device will exit a fluid transfer device either in a direction toward a dispense point, downstream, and/or in a direction of a source of a first fluid, upstream, and within a time period less than that of the ending of pulse 14 and a beginning of pulse 16. According to the exemplary embodiment shown in FIG. 1, if pulse 26 exits a fluid transfer device downstream, then the proportioning ratio is the ratio of, for example, the volume, of pulse 18 to the volume of pulse 14, and the volume of the proportioned fluids is the sum of the volumes of pulse 14 and pulse 18. If pulse 26 exits a fluid transfer device upstream, then the proportioning ratio is the ratio of the volume of pulse 18 to the volume of pulse 14 minus the volume of pulse 30, and the volume of the proportioned fluids is the volume of pulse 14 minus the volume of pulse 30, plus the volume of pulse 18.

Figure 2:
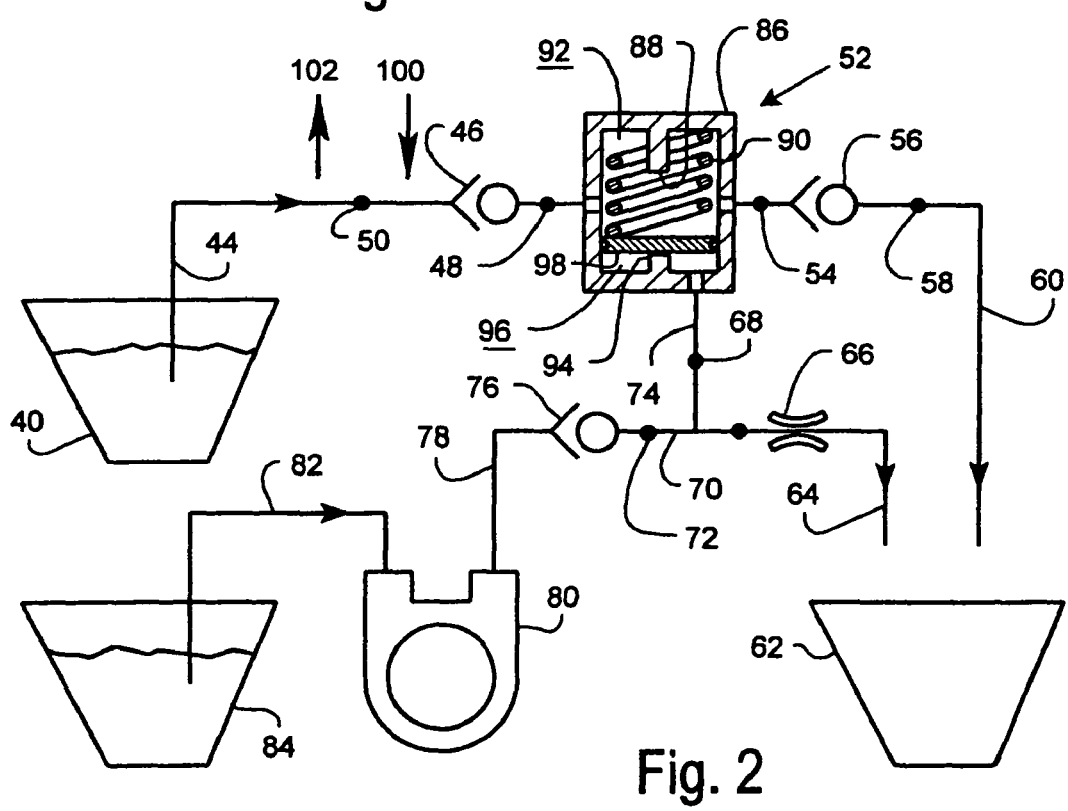
FIG. 2 is a schematic diagram of an exemplary embodiment of a system for supplying proportioned fluids.

FIG. 2 is a schematic view of an exemplary embodiment of pulse proportioning in a simplified, generalized system. According to the embodiment shown in FIG. 2, a first fluid reservoir 84 (e.g., a powering fluid reservoir) is a fluid source for pump intake line 82 and pump 80. Pump 80 is may be an accurate, positive displacement pump, examples of which include Fluid-o-Tech rotary vane pumps. A discharge line 78 connects to the outlet port of pump 80. Discharge line 78 then connects to a one-way valve 76, to a line 70, to a restriction 66, and to a dispense line 64. A pulse pressure line 74 connects fluid transfer device 52 (e.g., a pulse proportioning device) with line 70. A second fluid reservoir 40 is a fluid source for a fluid transfer device intake line 44. Intake line 44 may be connected to a one-way valve 46, to a fluid transfer device intake passage 48 (e.g., intake line), fluid transfer device 52, to a fluid transfer device outlet line 54, to a one-way valve 56, and to a dispense line 60. Both dispense line 64 and dispense line 60 may empty into a fluid container 62 for receiving a proportioned supply of the first and second fluids.

During exemplary operation, and assuming starting conditions of a first fluid in reservoir 84, a second fluid in reservoir 40, no fluid in container 62, variable volume chamber 92 filled with a second fluid, and a piston 98 resting against a travel stop 94 in direction 100, then operation of a first cycle may be described as follows. Pump 80 activates and a first powering fluid is pumped from reservoir 84 to container 62. This flow may correspond to pulse 14 in FIG. 1 at time 1.0 on the x-axis. A first fluid travels through one-way valve 76 and then through a restrictor 66. Restrictor 66 causes an elevated pump discharge pressure in line 70. The elevated pressure of line 70 increases the pressure of variable volume chamber 96 in fluid transfer device 52. The pressure of chamber 96 acts on piston 98 in housing 86 of fluid transfer device 52 and overcomes a countering force of a biasing element 90 (e.g., a spring), thereby moving piston 98 in direction 102. Piston 98's movement reduces the volume of a variable volume chamber 92 while increasing the volume of variable volume chamber 96 by a like amount. The flow of a first fluid into chamber 96 may correspond to pulse 30 in FIG. 1 at time unit 1.0 on the x-axis. A second fluid displaced by chamber 92 exits fluid transfer device 52 and flows to container 62, since reverse flow is blocked by one-way valve 46, but not by one-way valve 56. This flow may correspond to pulse 18 in FIG. 1 at time unit 1.0 on the x-axis. This piston movement in the example shown continues for an interval of 4.5 time units, until piston 98 contacts travel stop 88, ending pulse 18 and pulse 30 at time unit 5.5 on the x-axis shown in FIG. 1. Because the displacement caused by movement of piston 98 is fixed by travel stop 94 and travel stop 88, a known volume of the second fluid may be delivered into container 62. As shown in FIG. 1, pump 80 continues to run until time unit 6.5 on the x-axis, at which time pump 80 turns off and completes pulse 14. Because the flow from pump 80 is proportional to the running time of pump 80, the volume of the first fluid in pulse 14 may be known.

When pump 80 stops, the pressure in intake passage 68 (e.g., intake line) and chamber 96 falls. The force of biasing element 90 acts on piston 98 and overcomes a countering force of pressure in chamber 96, thereby moving piston 98 in direction 100. The piston 98's movement reduces the volume of variable volume chamber 96 while increasing the volume of variable volume chamber 92 by a like amount. The flow of a first fluid from chamber 96 may correspond to the beginning of pulse 26, as shown in FIG. 1 at time unit 6.5 on the x-axis. The increasing volume of chamber 92 causes a pressure reduction that can only be relieved by a second fluid flowing from reservoir 40 through one-way valve 46, since one-way valve 56 blocks any entry of fluid via line 60. The flow of a second fluid into chamber 92 may correspond to the beginning of pulse 22 shown in FIG. 1 at time unit 6.5 on the x-axis. This piston 98's movement continues for 1.0 time units until piston 98 contacts travel stop 94, ending pulse 22 and pulse 26 of FIG. 1 at time unit 7.5 on the x-axis, at which time the full volume of pulse 14 is delivered to container 62, since flow is blocked by one-way valve 76. As shown in FIG. 1, for a time interval between 7.5 time units and 8.0 time units on the x-axis, there is no movement of piston 98 and no flow. Thus, in the exemplary embodiment shown in FIG. 1, a complete cycle last for a duration of 7.0 time units, starting at time 1.0 and ending at time 8.0 on the x-axis of FIG. 1. At time 8.0, pump 80 may re-activate and run to begin a new cycle that includes pulse 16, pulse 20, pulse 24, pulse 28, and pulse 32, for example, as shown in of FIG. 1. According to some embodiments, by changing system parameters and by use of an appropriate control, the volume, interval, and/or frequency of the pulses, whether fixed or variable, may be arranged to achieve the objectives of a specific application.

Figure 3:
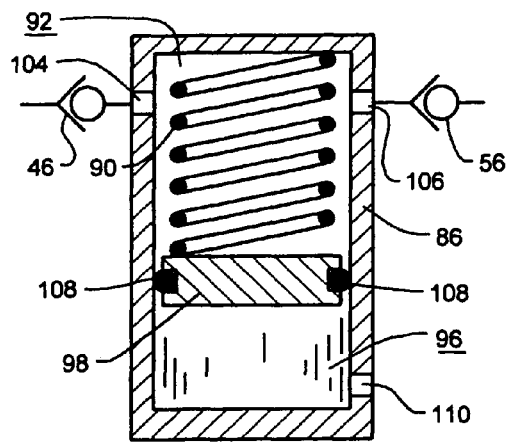
FIG. 3 is a schematic cross-section view of an exemplary embodiment of a fluid transfer device.

FIG. 3 is a schematic view of a cross-section of an exemplary fluid transfer device (e.g., a pulse device) that includes an exemplary biasing element 90. The exemplary fluid transfer device shown in FIG. 3 includes a closed, cylindrical housing 86 containing a moveable piston 98 with seal a 108, creating a variable volume chamber 92 and a variable volume chamber 96. Chamber 92 contains a biasing element 90 and defines an inlet port 104 and outlet port 106. According to the exemplary embodiment shown, biasing element 90 includes a coil spring. Inlet one-way valve 46 and outlet one-way valve 56 may be either integrated with inlet port 104 and outlet port 106, respectively, or located remotely, for example, as shown. Chamber 96 defines a port 110 for the entry and exit of a fluid (e.g., a powering fluid). Travel of piston 98 may be limited in direction 102, for example, by housing 86 and in direction 100, for example, by biasing element 90 (e.g., by a spring bottoming out against housing 86).

During exemplary operation as shown in FIG. 3, piston 98 moves in direction 100 in response to a change in pressure in chamber 96. A fluid momentarily has an increased pressure acting on piston 98 that exceeds a countering force of biasing element 90, creating a net force in direction 100. The pressure also overcomes resistive forces that may be present, such as, for example, friction associated with seal 108, the weight of piston 98, and/or the weight of a second fluid in chamber 92. The movement of piston 98 continues until it is mechanically stopped by an obstruction to further movement, for example, at a predetermined, known, and/or repeatable location. A second fluid in chamber 92 is forced out of outlet port 106, since exit via inlet port 104 is blocked by one-way valve 46, while the first fluid fills chamber 96 via port 110. Thereafter, the first fluid momentarily has a decreased pressure acting on piston 98 that is less that a countering force of biasing element 90, thus creating a net force in direction 102. The force of biasing element 90 may be aided by the weight of piston 98, the weight of a second fluid in chamber 92, and may be resisted by friction associated with seal 108. (This condition anticipates that the fluid transfer device will be oriented, such that the force of gravity is predominately in direction 102. It is contemplated that the fluid transfer device may have other orientations.) The movement of piston 98 may continue until it is mechanically stopped via an obstruction to further movement at, for example, a predetermined, known, and/or repeatable displacement. The second fluid fills chamber 92 via inlet port 104, since outlet port 106 is blocked by one-way valve 56, while the first fluid exits chamber 96 via port 110.

Figure 4:
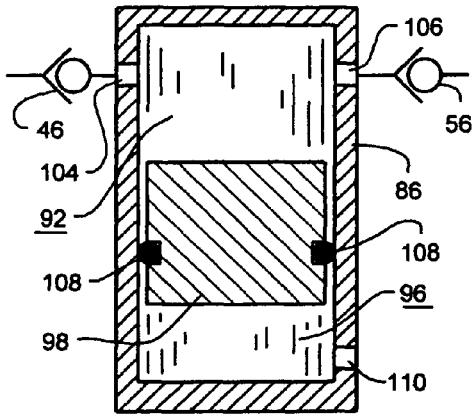
FIG. 4 is a schematic cross-section view of another exemplary embodiment of a fluid transfer device.

FIG. 4 is schematic cross-section view of an exemplary embodiment of a fluid transfer device (e.g., a pulse device) using a gravity return. The exemplary fluid transfer device includes a closed cylindrical housing 86 containing a moveable piston 98 and a seal 108, creating a variable volume chamber 92 and a variable volume chamber 96. Chamber 92 defines an inlet port 104 and outlet port 106. An inlet one-way valve 46 and an outlet one-way valve 56 may be either integrated with inlet port 104 and outlet port 106, respectively, or inlet one-way valve 46 and an outlet one-way valve 56 may be located remotely, for example, as shown in FIG. 4. Chamber 96 defines a port 110 for the entry and exit of a first fluid (e.g., a powering fluid). Travel of piston 98 may be limited in direction 102 by one end of housing 86 and in direction 100 by another end of housing 86. (This exemplary embodiment anticipates that the fluid transfer device will be oriented such that the force of gravity is predominately in direction 102. It is contemplated that the fluid transfer device may have other orientations.)

During exemplary operation, piston 98 moves in direction 100 in response to a change in pressure in chamber 96. A first fluid momentarily has an increased pressure acting on piston 98 that exceeds a countering force of biasing element (i.e., which, in this case, may be the force due to gravity) acting on piston 98 and a second fluid in chamber 92 creating a net force in direction 100. The pressure also overcomes other resistive forces that may be present, such as, for example, the force of friction associated with a seal 108. The movement of piston 98 continues until it is mechanically stopped by an obstruction to further movement at a predetermined, known, and/or repeatable location. A second fluid in chamber 92 is forced out of outlet port 106, since flow out of inlet port 104 is blocked by one-way valve 46, while the first fluid fills chamber 96 via port 110. Thereafter, the first fluid momentarily has a decreased pressure acting on piston 98 that is less than a countering force of gravity on piston 98 and a second fluid in chamber 92, thus creating a net force in direction 102. The force of gravity on piston 98 and a second fluid in chamber 92 may be resisted by seal 108's friction. The movement of piston 98 continues until it is mechanically stopped by an obstruction to further movement at a predetermined, known, and/or repeatable location. The second fluid fills chamber 92 via inlet port 104, since outlet port 106 is blocked by one-way valve 56, while the first fluid exits chamber 96 via port 110.

The exemplary embodiments schematically depicted in FIGS. 3 and 4 demonstrate exemplary methods of arranging a countering force to a pressure of a first powering fluid that basically varies with piston displacement due to biasing element 90, for example, a coil spring, as shown in FIG. 3 or the weight of piston 98, as shown FIG. 4. Although FIGS. 3 and 4 show an exemplary o-ring seal, which isolates the fluid in chamber 92 from the fluid in chamber 96, other types of seals may be used, including piston rings and/or diaphragms.

Figure 5:
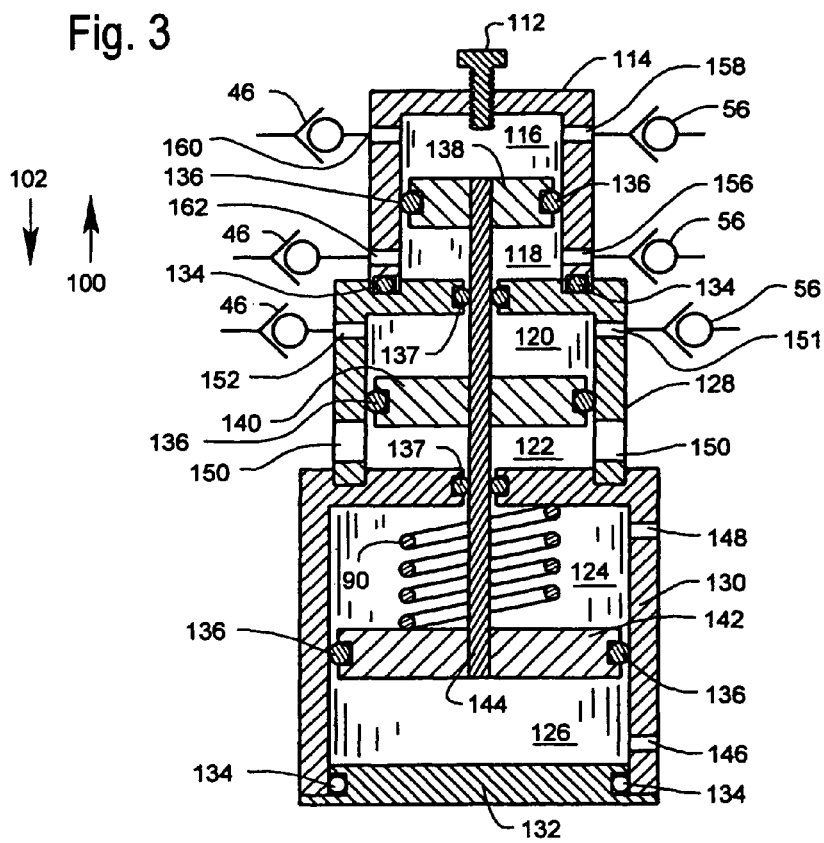
FIG. 5 is a schematic cross-section view of a further exemplary embodiment of a fluid transfer device.

FIG. 5 schematically depicts a cross-section of an exemplary embodiment of fluid transfer device. According to this exemplary embodiment, the fluid transfer device defines a first fluid section (e.g., a powering fluid section), includes a biasing element 90, and defines partially-hydraulically balanced variable volume chambers. The exemplary fluid transfer device defines a single acting variable volume chamber for a second fluid (e.g., a pumped fluid). This exemplary embodiment further defines a double acting, variable volume chamber for a third pumped fluid, and adjustable stroke control.

The exemplary fluid transfer device shown in FIG. 5 includes a cylindrical housing segment 130 and an end cap 132 with a static seal 134, and containing a moveable piston 142 with a dynamic seal 136, defining a variable volume chamber 126 and a variable volume chamber 124. Chamber 124 contains a biasing element 90 in the form of a coil spring and defines a pressure port 148. Chamber 126 defines a pressure port 146. Chambers 124 and 126 are configured to receive a first fluid (e.g., a powering fluid).

The exemplary fluid transfer device further includes a cylindrical housing segment 128 containing a moveable piston 140 with a seal 136, creating a variable volume chamber 122 and a variable volume chamber 120. Chamber 122 defines vent ports 150, and chamber 120 defines inlet port 152 and outlet port 151. Inlet one-way valve 46 and outlet one-way valve 56 may either be integrated with inlet port 152 and outlet port 151, respectively, or located remotely, as shown in FIG. 5. Chambers 120 and 122 constitute a section of the fluid transfer device configured to receive a second fluid (e.g., a pumped fluid), and this section of the fluid transfer device functions as a single acting pump.

The exemplary fluid transfer device shown in FIG. 5 further includes a cylindrical housing segment 114 containing a moveable piston 138 with a seal 136 creating a variable volume chamber 118 and a variable volume chamber 116. Chamber 118 defines an inlet port 162 and an outlet port 156. Chamber 116 defines an inlet port 160 and an outlet port 158 and includes an adjustable stroke stop 112. Inlet one-way valves 46 may be either integrated with inlet port 160 and inlet port 162 or located remotely, as shown in FIG. 5. Outlet one-way valves 56 may be either integrated with outlet port 158 and outlet port 156 or located remotely. Chambers 116 and 118 are configured to receive a third fluid (e.g., a pumped fluid) and function as a double acting pump.

According to the exemplary embodiment shown in FIG. 5, a piston assembly, including piston 138, piston 140, and piston 142, are operably coupled to one another via a link 144, for example, a shaft. According to some embodiments, the sections are fluidly isolated from one another at shaft penetrations via seals 137. During normal operation, the travel of the piston assembly is adjustable, yet fixed by mechanical contact at its stroke extremes. Housing segments may be sealed via seals 134, as shown. Piston 138, piston 140, and piston 142 may have equal areas or, as shown, differing areas as desired. Although o-ring seals are shown, other known sealing arrangements are contemplated, including, for example, piston ring(s) and/or diaphragms.

During operation, the piston assembly, including piston 142, piston 140, piston 138, and link 144 moves in direction 100 in response to a change in pressure in chamber 126. A first fluid (e.g., a powering fluid) momentarily increases pressure acting on piston 142, which exceeds a countering force of biasing element 90 and friction, thereby creating a net force in direction 100. Movement of the piston assembly continues in direction 100 until it is mechanically stopped, for example, via stroke stop 112, at a predetermined, known, and/or repeatable location. The volume of chamber 126 increases and is filled by the first fluid via port 146. The volume of chamber 124 decreases, and its contents are expelled via port 148. If port 148 communicates with atmosphere, then air is expelled. Such an air-filled chamber may constitute an air gap to provide further fluid isolation. According to some embodiments, port 148 may be in flow communication with a circuit fluid line to partially offset the pressure of chamber 126. Such an arrangement may be useful if, for example, the pressure in chamber 126 is so high that use of a sufficiently strong biasing element 90 might be undesirable. An example of such a situation may include a hydraulic system where, for example, pressure may reach 2,000 psi. The second fluid is forced out from the decreasing volume of chamber 120 via outlet port 151, since fluid flow out inlet port 152 is blocked via one-way valve 46, while air fills the increasing volume of chamber 122 via port 150. A third fluid is expelled from the decreasing volume of chamber 116 via outlet port 158, since flow out inlet port 160 is blocked by one-way valve 46, while the third fluid enters from the increasing volume of chamber 118 via inlet port 162, since fluid flow out outlet port 156 is blocked by one-way valve 56.

Thereafter, the first fluid momentarily has a decreased pressure acting on piston 142 that is less than a countering force of biasing element 90 and pressure of chamber 124 acting on piston 142. Additionally, the force differential may overcome any friction or gravitational effects present, thus creating a net force in direction 102. The movement of the piston assembly continues until it is mechanically stopped by an obstruction to further movement at a predetermined, known, and/or repeatable location.

The volume of chamber 124 increases and is filled by a pressure offsetting fluid via port 148. The volume of chamber 126 decreases, and the first fluid is expelled via port 146. The second fluid enters due to the increasing volume of chamber 120 via inlet port 152, since fluid flow out outlet port 151 is blocked by one-way valve 56, while air is expelled by the decreasing volume of chamber 122 via port 150. The third fluid is expelled from the decreasing volume of chamber 118 via outlet port 156, since fluid flow out inlet port 162 is blocked by one-way valve 46, while the third fluid enters due to the increasing volume of chamber 116 though inlet port 160, since fluid flow out outlet port 158 is blocked by one-way valve 56.

FIGS. 6 through 11 show exemplary embodiments of systems for supplying fluid (e.g., based on pulse proportioning). For example, both batch and continuous proportioning are described. In commercial use, for example, such systems may include a control system (for example, a built-in control system). Such control systems may be programmable. One or more of the exemplary systems shown in FIGS. 6-11 may include a control system.

Figure 6:
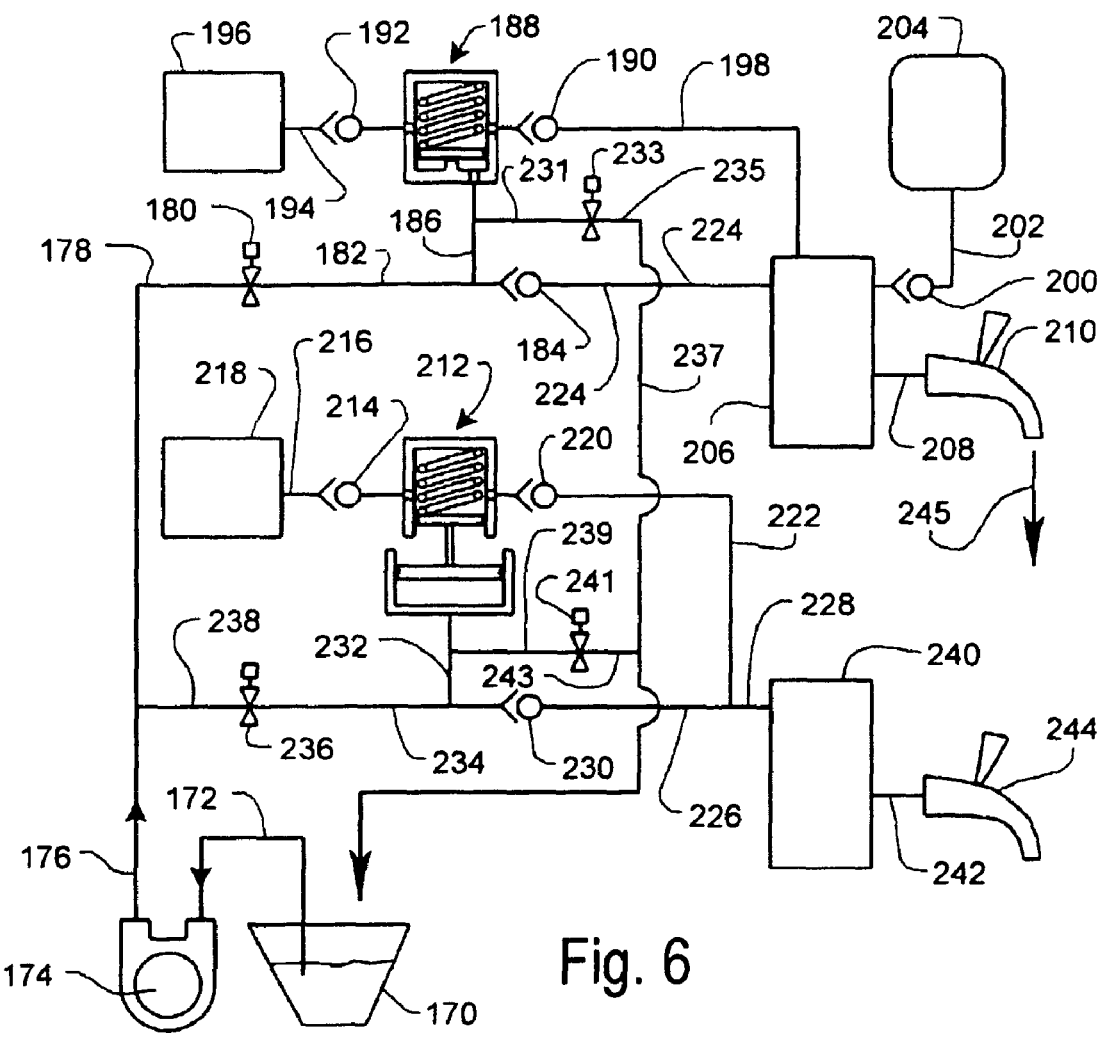
FIG. 6 is a schematic diagram of another exemplary embodiment of a system for supplying proportioned fluids.

FIG. 6 is a schematic view of an exemplary beverage dispensing system, including a multiple dispense point array with each array corresponding to a beverage flavor. The array may include carbonated and/or non-carbonated drinks. A first fluid source 170 (e.g., a powering fluid source) may be municipal water and/or water from a reservoir. Pump intake line 172 connects source 170 and pump 174. Pump 174 may be, for example, an accurate, positive displacement pump, examples of which include Fluid-o-Tech rotary vane pumps. Pump 174 boosts the pressure of a first fluid from pump intake line 172 to pump discharge line 176, such that it may serve as a first powering fluid. Discharge line 176 connects to branch line 238 and branch line 178. High and low level switches (not shown) in carbonator 240 may initiate and terminate a carbonator cycle. However, the actual cycle time may be controlled by a controller that subtracts or adds discrete time segments that may correspond to pulsed volumes.

A flow control valve 236 (e.g., an on-off valve) joins line 238 with line 234. Valve 236 may include, for example, a solenoid valve. A one-way valve 230 joins line 234 to line 226. Line 226 joins to accumulator 240. A valve 244 (e.g., a manually-operated valve) controls the flow of beverage out of the dispenser system. A syrup source 218 (e.g., a bag-in-box syrup container) connects to intake passage 216 (e.g., intake line), to one way valve 214, and to fluid transfer device 212 (e.g., a pulser). Exemplary fluid transfer device 212 is a single action, spring return pulse proportioning device having a larger first fluid piston for water and a smaller second fluid piston for syrup, as described previously herein. Fluid transfer device 212 may be joined to one-way valve 220, line 222, and to accumulator 240. Intake passage 232 (e.g., intake line) joins a water line 234 to fluid transfer device 212. This branch circuit takes syrup and water into accumulator 240, where the beverage is mixed and stored for consumption. Drink is dispensed from accumulator 240 through line 242 and through dispense valve 244.

A flow control valve 180 joins line 182 with line 178. Flow control valve 180 may be a solenoid valve. A one-way valve 184 joins line 182 to line 224. Carbonator 206 is joined to line 224. A valve 210 (e.g. a manual valve) controls the flow of carbonated beverage 245. A syrup source 196 (e.g., a bag-in-box syrup container) connects to intake passage 194, to one-way valve 192, and to a fluid transfer device 188 (e.g., a pulser). Exemplary fluid transfer device 188 may be a single action, spring return pulse proportioning device having two variable volume chambers separated by a piston, one of which contains a first fluid (e.g., water) and another of which contains a second fluid (e.g., a syrup) as described previously herein. Fluid transfer device 188 is joined to one-way valve 190, to line 198, and to carbonator 206. Intake passage 186 joins a water line 182 to fluid transfer device 188. A compressed carbon dioxide gas communicates with carbonator 206 via line 202, then one-way valve 200, and then carbonator 206. This branch circuit takes syrup and water into carbonator 206, where the beverage may be thoroughly mixed and stored for consumption. Carbonated drink may be dispensed from carbonator 206 via line 208, then through dispense valve 210.

According to the exemplary embodiment shown in FIG. 6, a hydraulic circuit included in the dispenser system allows a low pressure connection to fluid transfer device 188 and fluid transfer device 212. Fluid transfer device 188 connects to intake passage 186, to line 231, to valve 233 (e.g., a solenoid valve), to line 235, to line 237, and discharges into water source reservoir 170. Fluid transfer device 212 connects to intake passage 232, to line 239, to valve 241 (e.g., a solenoid valve), to line 243, to line 237, and discharges into water source reservoir 170.

During exemplary operation, dispense valve 244 may be opened and beverage (not shown) pours into beverage container (not shown), since the pressure of beverage is higher than atmospheric pressure within accumulator 240. The loss of dispensed volume in accumulator 240 will reduce the pressure within accumulator 240 and may reduce the pressure to the low set point of a fill pressure switch (not shown). If so, a fill pressure switch may signal a dispenser controller (not shown) that initiates a replenishment sequence that includes opening valve 236 (e.g., a solenoid valve) and activating pump 174 for a timed period. A first fluid (e.g., water) flows into accumulator 240 via line 238, through valve 236, through line 234, through one-way valve 230, through line 226, through line 228, and into accumulator 240. Since pressure in line 234 communicates with fluid transfer device 212 through intake passage 232 and the force of this pressure exceeds the force of a biasing element (e.g., a spring) plus the force of syrup pressure, the full volume of syrup in fluid transfer device 212 is displaced through one-way valve 220, then line 222, then line 228, and into accumulator 240. The timed period for activation of pump 174 ends, and then, for example, a controller turns off pump 174 and closes flow control valve 236 and a fixed (e.g., known) volume of water was pumped by pump 174. With pump 174 turned off, valve 241 opens, allowing pressure in intake passage 232, line 239, line 243, and line 237 to fall to atmospheric pressure. The biasing element in fluid transfer device 212, which may be capable of overcoming atmospheric pressure, displaces the water in fluid transfer device 212 into water source reservoir 170. Fluid transfer device 212 draws in a charge of syrup from source 218 via line 216, and one-way valve 214, completing a replenishment cycle.

During operation, dispense valve 210 is opened and beverage 245 pours into beverage container (not shown), since the pressure of beverage 245 is higher than atmospheric pressure within carbonator 206. The loss of dispensed volume in carbonator 206 will reduce the beverage level within carbonator 206 and may reduce the level to the low set point of a high/low level switch (not shown). If so, a level switch signals a dispenser controller (not shown) that initiates a replenishment sequence that includes opening valve 180 and activating pump 174 for a timed period. A first fluid (e.g., water) flows into carbonator 206 via line 178, via valve 180, via line 182, via one-way valve 184, via line 224, and into carbonator 206. Since pressure in line 182 communicates with fluid transfer device 188 via intake passage 186, and the force of this pressure exceeds the force of the biasing element and the force of syrup pressure, the full volume of syrup in fluid transfer device 188 is displaced through one-way valve 190, then line 198, and into carbonator 206. A timed period of pump 174 ends, and pump 174 is deactivated (e.g., via a controller) and closes flow control valve 180 after a known volume of water is pumped via pump 174. With pump 174 deactivated, valve 233 opens, allowing pressure in intake passage 186, line 231, line 235, and line 237 to fall to atmospheric pressure. A biasing element in fluid transfer device 188 capable of overcoming atmospheric pressure displaces the water in fluid transfer device 188 into water source reservoir 170 or alternatively to a drain. Fluid transfer device 188 draws in a charge of syrup from source 196 via line 194 and one-way valve 192, completing a replenishment cycle. If the source of the first fluid is a municipal water supply, the pressure of intake passage 186, line 231, line 235, and line 237 may decrease to that of the pressure of the municipal water supply.

One replenishment cycle may not be sufficient to satisfy a pressure switch high set point. Therefore, a controller and/or operator may initiate more cycles as desired. If a carbonated drink is dispensed from carbonator 206, a controller may initiate a pulse cycle in the branch circuit beginning with line 178. It is not necessary for a controller to satisfy branch circuit replenishment sequentially, for example, replenishment cycles may be interleaved.

Figure 7:
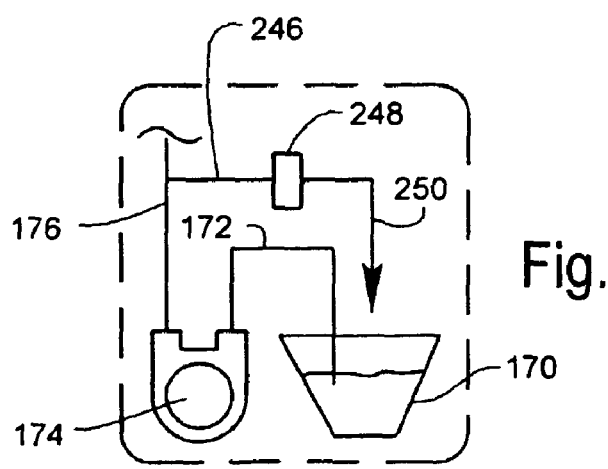
FIG. 7 is a schematic diagram of an exemplary embodiment of a portion of an exemplary embodiment of a system for supplying proportioned fluids.

FIG. 7 is a schematic view of an exemplary system, for example, a beverage dispensing circuit, that enables a first fluid (e.g., a powering fluid) to be pulsed while a pump and motor run continuously. For example, a first fluid source 170 (e.g., municipal water and/or water from a reservoir) may be in flow communication with a pump 174 via intake line 172. Pump 174 may be, for example, an accurate, positive displacement pump, examples of which may include Fluid-o-Tech rotary vane pumps. Pump 174 boosts the pressure of the first fluid to outlet line 176 making it a first powering fluid. An alternative way of creating a first fluid pulse is to divert flow rather than starting and stopping flow by turning pump 174 on and off. This may be achieved, for example, by using a diversionary circuit that may include a line 246, a relief valve 248, and return line 250. During operation, flow to branch line 178 may be blocked via valve 180, and branch line 238 may be blocked via valve 236. The pressure in line 176 increases and may reach a set point of relief valve 248, causing relief valve 248 to open and allow flow to return line 250. Return line 250 may discharge into reservoir 170 and/or into intake line 172, for example, if no reservoir is utilized. The set point of relief valve 248 may be set sufficiently high that all (or at least most) flow goes to branch line 178 or branch line 238, if not blocked. As an alternative to relief valve 248, the system may include a controller responsive solenoid valve (not shown), which may serve to replace relief valve 248 in creating a diverting circuit.

Figure 8:
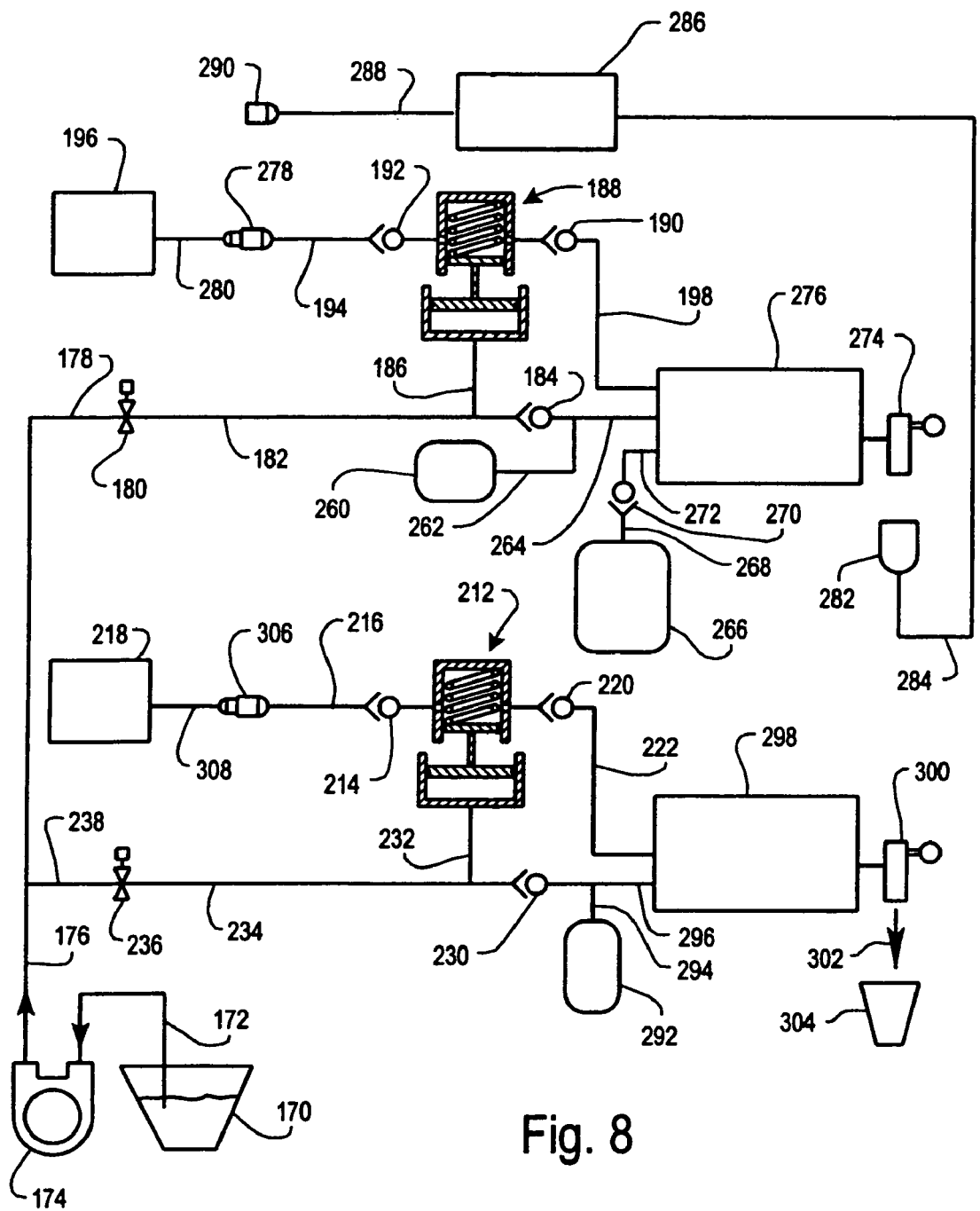
FIG. 8 is a schematic diagram of a further exemplary embodiment of a system for supplying proportioned fluids.

FIG. 8 is a schematic view of an exemplary system (e.g., a beverage dispensing system) that may include a multiple dispense point array, for example, with each dispense point corresponding to a particular fluid or flavor. According to some embodiments, the array may include carbonated drinks, non-carbonated drinks, carbonated frozen drinks, and/or non-carbonated frozen drinks. In the exemplary embodiment shown in FIG. 8, a first fluid source 170 may be municipal water and/or water from a reservoir, and intake line 172 provides flow communication between first fluid source 170 and pump 174. Pump 174 may be, for example, an accurate, positive displacement pump, examples of which may include Fluid-o-Tech rotary vane pumps. Pump 174 boosts the pressure of a first fluid from intake line 172 to discharge line 176 to make it a first powering fluid. Discharge line 176 connects to branch line 238 and branch line 178.

A flow control valve 236 (e.g., an on-off valve) joins line 238 with line 234. Valve 236 may be, for example, a solenoid valve. A one-way valve 230 joins line 234 to line 296. Accumulator 292 may be joined to line 296 via line 294. Line 296 may be joined to a freezer apparatus 298 (e.g., a freezer barrel). A valve 300 (e.g., a manually-operated valve) may control the flow of frozen beverage 302 into a cup 304 (e.g., a beverage cup). A syrup source 218 (e.g., a bag-in-box syrup container) connects to line 308, then to (in the exemplary embodiment shown) quick disconnect coupling 306, then to line 216, then to one-way valve 214, then to fluid transfer device 212 (e.g., a pulser). Exemplary fluid transfer device 212 may be a single action, spring return pulse proportioning device having a larger first fluid piston for water and a smaller second fluid piston for syrup, for example, as described previously herein. Fluid transfer device 212 may be joined to one-way valve 220, then to line 222, then to freezer apparatus 298. intake passage 232 may join a water line 234 to fluid transfer device 212. This exemplary branch circuit takes syrup and water into freezer apparatus 298, where the beverage may be thoroughly mixed and frozen into, for example, a non-carbonated slush for consumption. Frozen drink may be dispensed from freezer apparatus 298 via dispense valve 300.

An on-off valve 180 may join line 182 with line 178. Valve 180 may be, for example, a solenoid valve. As shown in FIG. 8, a one-way valve 184 joins line 182 to line 264. Accumulator 260 is joined to line 264 via line 262. Line 264 joins to freezer apparatus 276. A valve 274 (e.g., a manually-operated valve) may control the flow of frozen beverage (not shown). A syrup source 196 (e.g., a bag-in-box syrup container) connects to line 280, then optionally to quick disconnect coupling 278, then to intake passage 194, then to one-way valve 192, then to fluid transfer device 188 (e.g. a pulser). Fluid transfer device 188 may be, for example, a single action, spring-return pulse proportioning device having a larger first fluid piston for water and a smaller second fluid piston for syrup, for example, as described previously herein. Fluid transfer device 188 may be joined to one-way valve 190, then to line 198, then to freezer apparatus 276. Line 186 joins a water line 182 to fluid transfer device 188. A compressed carbon dioxide gas may optionally be in flow communication with freezer apparatus 276 via line 268, then to one-way valve 270, then to line 272. This branch circuit may, for example, take syrup and water into freezer apparatus 276, where the beverage is thoroughly mixed and frozen into a carbonated slush for consumption. Frozen drink may be dispensed from freezer apparatus 276 via dispense valve 274.

Fluids such, as for example, beverage syrups and concentrates, may have various rates of spoilage. For example, with fast spoiling syrup and concentrates, it may be desirable to have a dedicated clean-in-place (CIP) sanitizing subsystem. For example, a sanitizing system may circulate a sanitizing fluid, (e.g., a sanitizing solution) through the system wherever the fluids have been present (e.g., where syrup and/or concentrate have been present). A CIP subsystem may include, for example, a coupling 290 (e.g., a quick-connect coupling), joined to line 288, joined to a CIP pump (not shown, or optionally fluid transfer device 188 may be used to circulate sanitizing fluid 286), and sanitizing fluid 286, joined to coupling 282 (e.g., a quick connect coupling). To form a sanitizing loop, line 280 may be disconnected from line 194 via coupling 278. Intake passage 194 may then be joined to line 288 via coupling 278 and coupling 290. Line 284 may be joined to valve 274 via coupling 282.

During operation, dispense valve 300 may be opened, and, for example, frozen beverage 302, pours into beverage container 304, since the pressure of frozen beverage 302 is higher than atmospheric pressure within freezer apparatus 298. The loss of dispensed volume in freezer apparatus 298 will reduce the pressure within freezer apparatus 298 and may reduce the pressure to a low set point of a fill pressure switch (not shown). If so, an optional fill pressure switch may signal a controller (not shown) that initiates a replenishment sequence, which may include opening valve 236 (e.g., a solenoid valve) and turning on pump 174 for a timed period. A first fluid (e.g., water) flows into freezer apparatus 298, while pressurizing line 296, line 294, accumulator 292, intake passage 232, line 234, and line 238. Since pressure in intake passage 232 communicates with fluid transfer device 212, the full volume of syrup in fluid transfer device 212 is displaced through check valve 220, then line 222, and into freezer apparatus 298. A timed period of operation of pump 174 ends, and a controller turns off pump 174 and closes valve 236, for example, after a known volume of water has been pumped via pump 174. With pump 174 turned off, pressure in line 232 falls, and a biasing element (e.g., a return spring) in fluid transfer device 212 displaces the water into accumulator 292 through intake passage 232, line 234, one-way valve 230, line 296, and line 294. Fluid transfer device 212 draws in a charge of syrup from source 218 through line 308, through optional coupling 306, through line 216, and one-way valve 214, completing a replenishment cycle.

One replenishment cycle may not be sufficient to satisfy a pressure switch high set point. According to some embodiments, a controller and/or operator may initiate more cycles, as desired. For example, if a carbonated drink is dispensed from freezer apparatus 276, a controller may initiate operation of the branch circuit, beginning with line 178. It is not necessary for a controller to satisfy freezer apparatus replenishment sequentially, for example, replenishment cycles may be multiplexed.

Figure 9:
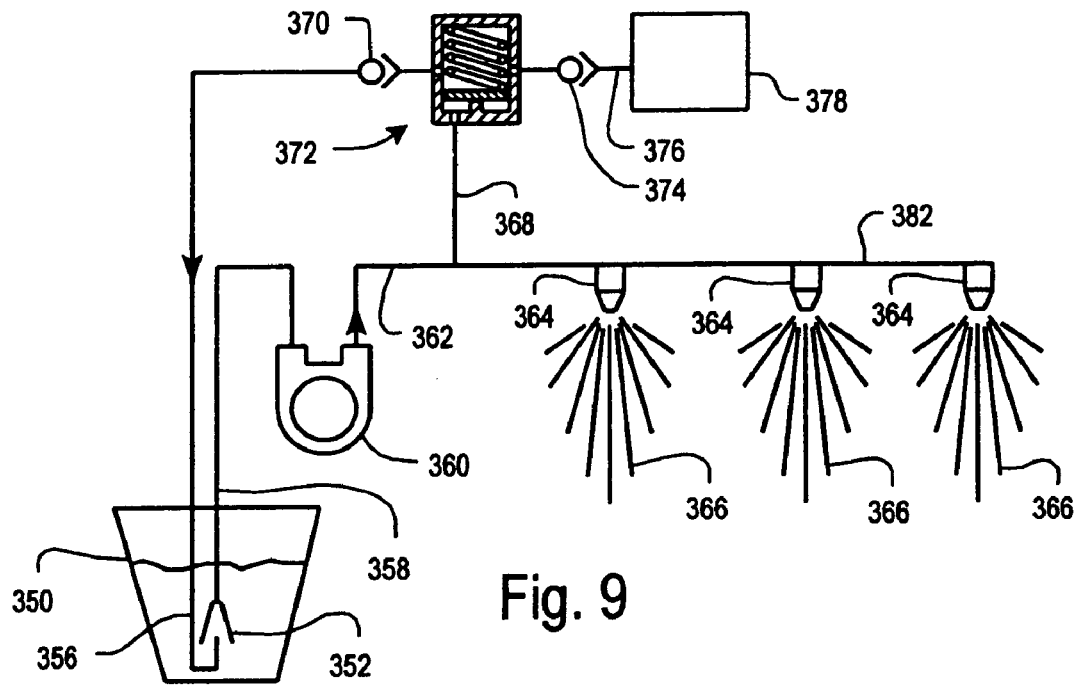
FIG. 9 is a schematic diagram of another exemplary embodiment of a system for supplying proportioned fluids.

FIG. 9 is a schematic view of an exemplary system that may serve, for example, as a spray dispensing system with a multiple dispense points array and continuous proportioning. One exemplary use may include residential and/or commercial misting systems for irrigation (e.g., lawn irrigation), pest control (e.g., mosquito control), and/or plant control (e.g., weed control). For example, a reservoir 350 may be filled with a known volume of a first fluid, for example, water. A known volume of water may be facilitated by use of, for example, a high/low level switch and/or valve (not shown). An inlet funnel 352 may be connected to an intake line 358, which may be connected to an inlet port of pump 360. An outlet port of pump 360 may be connected to line 362, which may include multiple spray nozzles 364 configured to discharge a spray mist 366 into the atmosphere (e.g., including dispersed droplets of fluid). A fluid transfer device 372 (e.g., a pulser) may be connected to line 362 via intake passage 368. A second fluid source 378, such as, for example, a bottle of pesticide or herbicide concentrate, may be connected to fluid transfer device 372 via line 376 through one-way valve 374. Fluid transfer device 372 may be connected to one-way valve 370 and then to line 356, which may terminate at funnel 352.

During operation, a controller (not shown) or operator may activate a positive displacement pump of a known flow rate for a timed period. Water 352 is drawn into intake funnel 35 and sprayed out under pressure via pump 360. The pressure and flow in line 362 overcomes a countering biasing element (e.g., a spring) force in fluid transfer device 372 and displaces a pesticide or herbicide concentrate in fluid transfer device 372. The concentrate exits fluid transfer device 372 through one-way valve 370, since its flow is blocked by one-way valve 374. The concentrate flows through line 356 until discharged into funnel 352, where it is entrained by water drawn into funnel via pump 360. The concentrate and water are mixed in line continuously and sprayed out as a solution. Fluid transfer device 372 contains a known volume of the concentrate. The flow rate of the concentrate from fluid transfer device 372 may be set by, for example, adjustment to flow resistance, powering pulse pressure, and spring rate, to establish a proportioning ratio. Before the timed pulse from pump 360 ends, the concentrate may be fully displaced in fluid transfer device 372, and the flow into funnel 352 may be ended. When a powered pulse time period ends and pump 360 turns off, pressure in line 362, intake passage 368, and then fluid transfer device 372 falls. The force of biasing element in fluid transfer device 372 overcomes the falling pressure and displaces a first fluid (e.g., water). As the concentrate chamber of fluid transfer device 372 increases in volume, the concentrate from source 378 is drawn through line 376 and one-way valve 374, since fluid flow into line 356 is blocked by one-way valve 370. Thus, fluid transfer device 372 is filled with a second fluid, pesticide concentrate, thereby completing a cycle, and a second cycle is ready to begin when initiated by, for example, a controller and/or operator.

Figure 10:
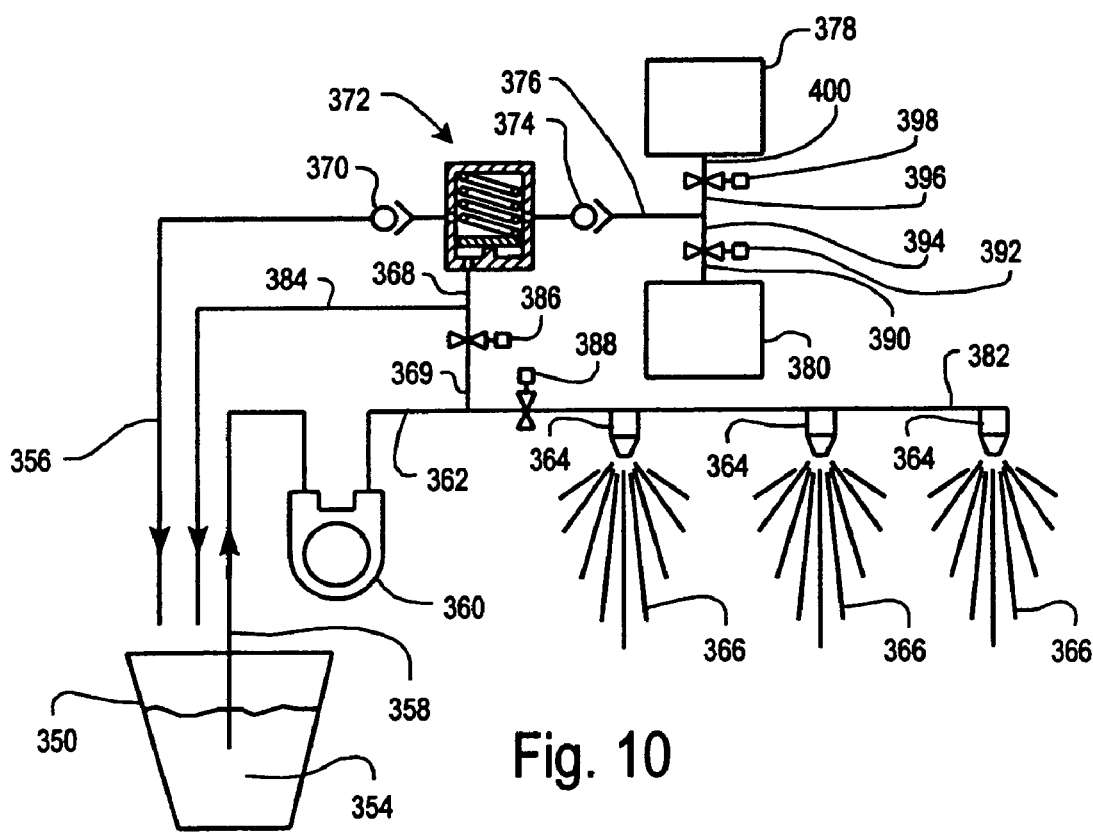
FIG. 10 is a schematic diagram of a further exemplary embodiment of a system for supplying proportioned fluids.

FIG. 10 is a schematic view of an exemplary system that may be used, for example, as a spray dispensing system with multiple dispense points array, multiple concentrates, and batch proportioning. A reservoir 350 may be filled with a known volume of a first fluid (e.g., water). A known volume of first fluid may be achieved by the use of, for example, a high/low level switch and/or valve (not shown). Intake line 358 may be connected to an inlet port of pump 360. An outlet port of pump 360 may be connected to line 362, which includes multiple spray nozzles 364 to discharge a spray mist 366 into the atmosphere. A fluid transfer device 372 may be connected to line 362 by intake passage 369, through a valve 386 (e.g., a solenoid valve), and then to intake passage 368. Line 384 may be connected to line 369 and provide flow communication to container 350. A second fluid source 378, such as, for example, a pesticide or herbicide concentrate (e.g., a bottle or other source) may be connected to fluid transfer device 372 via line 400 through valve 398 (e.g., a solenoid valve), then line 396, then intake passage 376, through one-way valve 374 to fluid transfer device 372. A third fluid source 380, such as, for example, a pesticide or herbicide concentrate (e.g., a bottle or other source), may be connected to fluid transfer device 372 by line 390, through valve 392 (e.g., a solenoid valve), then line 394, then intake passage 376, through one-way valve 374, and to fluid transfer device 372. Fluid transfer device 372 may be connected to one-way valve 370 and then to line 356, which provides flow communication into container 350.

During operation according to the exemplary embodiment shown in FIG. 10, a batch of solution may be proportioned by one or more pulses, and when the proportioning sequence is completed, the solution may be dispensed. During operation, a controller (not shown) or operator, may activate a pump 360. A first fluid 354 (e.g., initially only water) is drawn into pump 360 via intake line 385 and pumped out through discharge line 362, into line 369, and into line 384, where the first fluid empties back into container 350, since a fluid path is open through valve 386 (e.g., a solenoid valve) and blocked by valve 388 (e.g., a solenoid valve). The pressure and flow in intake passage 369 and communicated through intake line 368 overcomes a countering force due to a biasing element in fluid transfer device 372 and displaces the concentrate in fluid transfer device 372. The concentrate is expelled from fluid transfer device 372 through one-way valve 370, since its flow is blocked by one-way valve 374. The concentrate flows through line 356 until discharged into container 350, where it mixes with first fluid 354 to form a solution. Fluid transfer device 372 contains a known volume of the concentrate. When a powered pulse time period ends and pump 360 turns off, pressure in line 362, line 369, line 368, and then pulser 372 falls. The force of a biasing element (e.g., a countering spring) in fluid transfer device 372 overcomes the falling pressure and displaces a solution of a first combination of water and the concentrate. As the concentrate chamber of fluid transfer device 372 increases in volume, the concentrate from source 378 is drawn through line 400, valve 398 (e.g., a solenoid valve), then line 396, then intake passage 376, then through one-way valve 374 and into fluid transfer device 372, since flow communication is blocked by one-way valve 370. A second concentrate 380 is blocked from entering pulser 372 by valve 392 (e.g., a solenoid valve). Thus, fluid transfer device 372 is filled with a second fluid, a second concentrate, a cycle is completed, and a second cycle is ready to begin when initiated by a system controller and/or operator.

A second cycle may include one or more doses of the concentrate from source 378 and/or alternatively doses from the concentrate source 380. These pulsing cycles may be continued, for example, until the desired composition of the batch in container 350 is reached. When reached, pump 360 may be activated and the solution in container 350 may be drawn into pump 360 through intake line 385. A solution from container 350 may be sprayed as, for example, a mist 366, through nozzles 364 on line 382, which are connected to the discharge port of pump 360 by line 362, since the fluid path is open through valve 388 and blocked via valve 386.

Figure 11:
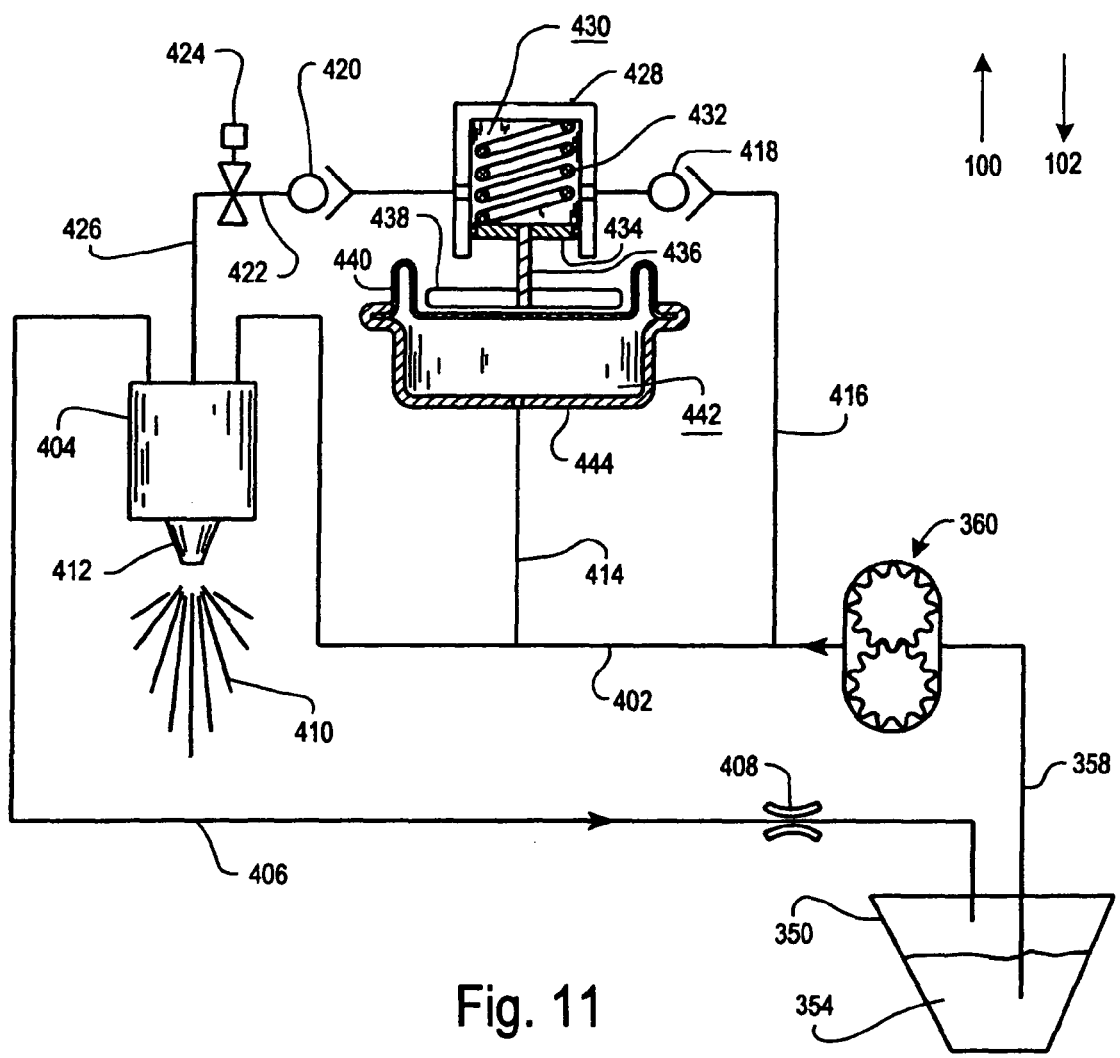
FIG. 11 is a schematic diagram of an exemplary system for amplifying fluid flow.

FIG. 11 is a schematic view of an exemplary system that may be used, for example, as a spray dispensing system with a single fluid pulse device including both sampling and amplifying (e.g., intensifying) aspects. Exemplary applications include treatment of $NO_X$ emissions from internal combustion engines, such as, for example, compression ignition engines (e.g., diesel engines) via selective catalytic reduction (SCR).

In the exemplary embodiment shown in FIG. 11, a reservoir 350 may contain a first fluid, for example, a urea-water solution 354. First fluid 354 enters a pump 360 through intake line 358. Pump 360 connects to discharge line 402, to an optional cooling jacket 404 (e.g., a nozzle cooling jacket), a return line 406, which empties into reservoir 350 and which may also include a flow restrictor 408 for increasing a discharge pressure on pump 360. A fluid transfer device (e.g. a pulser) includes a housing 444, a diaphragm 440, and a piston 438 forming a variable volume chamber 442. Fluid transfer device also includes a housing 428, a piston 434, and a biasing element 432 (e.g., a return spring) forming a variable volume chamber 430. Piston 434 and piston 438 may be operably coupled via a link 436 (e.g., a shaft). The flow and pressure in line 402 communicates with chamber 442 via intake passage 414. Chamber 430 communicates with line 402 via intake passage 416 and a one-way valve 418. Urea-water spray 410 exits nozzle 412, which is in flow communication with chamber 430 via line 426, valve 424 (e.g., a solenoid valve), then one-way valve 420, and then chamber 430.

During operation, a controller (not shown) and/or operator, activates pump 360. A urea-water solution is pumped from reservoir 350 through an optional cooling loop that includes line 358, line 402, cooling jacket 404, and line 406, under pressure, and then empties back into reservoir 350. The flow and pressure of line 402 fills chamber 442 via intake passage 414, displacing piston 438, link 436, and piston 434, in direction 100, since the force from pressure in chamber 442 overcomes a countering force of a biasing element 432 and force from pressure in chamber 430. Since the area of piston 438 may be several times the area of piston 434, the pressure in chamber 430 may be several times the pressure in chamber 442. Thus, the fluid transfer device acts as a fluid flow amplifier (e.g., an intensifier of the pressure). As the volume of chamber 442 increases, the volume of chamber 430 decreases. The urea-water solution exits nozzle 412 as a spray 410 into, for example, the exhaust system of a compression-ignition internal combustion engine (not shown), via a fluid path that includes line 426, valve 424, line 422, and one-way valve 420, since the flow of first fluid is blocked by one-way valve 418. Valve 424 interrupts the flow of the fluid into spray nozzle 412 by its on-off operation. Thus, the delivery of the fluid may be controlled via, for example, pulse-width-modulation of valve 424 via, for example, a controller responsive to a sensor (not shown) monitoring the condition of an internal combustion engine and/or exhaust.

Thereafter, the volume of chamber 430 may decrease until a travel limit is reached, and fluid is no longer delivered to nozzle 412. A controller and/or operator may detect such condition and may deactivate pump 360 for a timed period. The pressure of chamber 442 falls, since it is no longer maintained by operation of pump 360. The force of a biasing element 432 overcomes the force of pressure in chamber 442, and piston 434 is displaced in direction 102. The fluid in chamber 442 is displaced into reservoir 350 by the decreasing volume of chamber 442. The increasing volume of chamber 430 fills with urea-water solution from line 402 through intake passage 416, through one-way valve 418, since the alternate path is blocked by one-way valve 420. Thus, a fluid transfer device acts as a sampler, drawing in a portion of a the fluid (e.g., a urea-water solution). Once replenishment of fluid transfer device is completed and the time period expires, then a controller or operator may resume operation of pump 360, and a new cycle may begin.

It will be apparent to those skilled in the art that various modifications and variations can be made to the structured and methodologies described herein. Thus, it should be understood that the invention is not limited to the subject matter discussed in the description. Rather, the present invention is intended to cover modifications and variations.

What is claimed is:

1. A system for supplying at least two fluids in proportioned quantities, the system comprising:
   a first intake passage configured to be in flow communication with a source of a first fluid;
   a second intake passage configured to be in flow communication with a source of a second fluid;
   a fluid transfer device in flow communication with the first intake passage and the second intake passage; and
   a pump in flow communication with the first intake passage, the pump being configured to transfer the first fluid via the first intake passage to the fluid transfer device,
   wherein the fluid transfer device comprises a first chamber and a second chamber, and the first intake passage is in flow communication with the first chamber and the second intake passage is in flow communication with the second chamber,
   wherein operation of the pump is configured to supply a quantity of the first fluid to the first chamber such that a quantity of the second fluid is expelled from the second chamber, and when operation of the pump is ceased, a quantity of the second fluid enters the second chamber and a quantity of the first fluid is expelled from the first chamber.

2. The system of claim 1, wherein the fluid transfer device comprises at least one piston configured to reciprocate within the fluid transfer device such that a first volume defined by the first chamber and a second volume defined by the second chamber are variable.

3. The system of claim 2, wherein the fluid transfer device comprises a biasing element configured to move the piston to a position in which the volume of the first chamber is reduced.

4. The system of claim 3, wherein the biasing element comprises a spring.

5. The system of claim 3, wherein the biasing element comprises gravity.

6. The system of claim 1, wherein the proportioned quantity is fixed.

7. The system of claim 1, wherein the proportioned quantity is based on volume.

8. The system of claim 1, wherein the fluid transfer device is configured such that the quantity of the first fluid and the quantity of the second fluid expelled from the first and second chambers, respectively, have a fixed proportion with respect to one another.

9. The system of claim 1, wherein at least one of the first intake passage and the second intake passage is in flow communication with a one-way valve configured to prevent flow in a direction away from the fluid transfer device.

10. The system of claim 1, further comprising a first outlet passage and a second outlet passage providing flow communication from the first chamber and the second chamber, respectively, wherein at least one of the first and second outlet passages is in flow communication with a one-way valve configured to prevent fluid expelled from the first and second chambers from returning to the first and second chambers, respectively.

11. The system of claim 1, wherein the pump comprises a positive displacement pump.

12. The system of claim 11, wherein the pump comprises a rotary vane pump.

13. The system of claim 1, further comprising a controller configured to cause a pulsed flow of the first fluid, wherein the pump is activated via the controller.

14. The system of claim 13, wherein the controller is configured to cause the pulsed flow to be repeated according to at least one of a predetermined pulse duration, a predetermined pulse frequency, and a predetermined pulse magnitude.

15. The system of claim 13, wherein the controller is configured to cause at least one of a pulse duration and a pulse frequency responsive to a signal initiated by at least one sensor.

16. The system of claim 1, wherein the system comprises a plurality of fluid transfer devices configured to provide proportioned quantities of at least three fluids.

17. The system of claim 16, wherein at least two of the plurality of fluid transfer devices are configured to operate independently of one another.

18. The system of claim 17, further comprising a flow control valve configured to selectively shut-off flow communication to one of the plurality of fluid transfer devices.

19. The system of claim 1, wherein the fluid transfer device comprises a plurality of pistons configured to vary the volume of a plurality of chambers.

20. The system of claim 19, wherein at least two of the pistons are operably coupled to one another via a link.

21. The system of claim 19, wherein the plurality of pistons comprises three pistons configured to provide proportioned quantities of at least three fluids.

22. The system of claim 19, wherein the fluid transfer device comprises seals configured to fluidly isolate the chambers from one another.

23. The system of claim 19, wherein the fluid transfer device comprises one biasing element.

24. The system of claim 2, wherein the fluid transfer device comprises a stroke stop configured to limit a stroke of the piston, wherein the stroke stop is configured to adjust the stroke.

25. The system of claim 1, further comprising a first outlet passage and a second outlet passage providing flow communication from the first chamber and the second chamber, respectively, wherein the first and second outlet passages are configured such that proportioned quantities of the first fluid and the second fluid are mixed following passage through the first and second outlet passages.

26. The system of claim 1, wherein at least one of the quantity of the first fluid and the quantity of the second fluid is expelled to a drain.

27. The system of claim 1, wherein the system is configured such that intermittent flow of the first fluid is supplied to the fluid transfer device via continuous operation of the pump and a flow control valve.

28. The system of claim 27, wherein the flow control valve is in flow communication with the first intake passage between the pump and the fluid transfer device, and the system further comprises
a relief passage configured to provide flow communication between the first intake passage and the source of the first fluid; and
a relief valve configured to provide flow communication between the first intake passage and the source of the first fluid when the flow control valve is closed.

29. The system of claim 1, further comprising an accumulator configured to receive proportioned quantities of the first fluid and the second fluid for combining the proportioned quantities of the first and second fluids.

30. The system of claim 29, further comprising a source of carbon dioxide in flow communication with the accumulator.

31. The system of claim 29, further comprising a freezer apparatus in flow communication with the accumulator, wherein the freezer apparatus is configured to at least one of partially freeze and mix the proportioned quantities of the first and second fluids.

32. The system of claim 1, further comprising at least one spray nozzle configured to spray a combination of the first fluid and the second fluid following flow out of the fluid transfer device.

33. The system of claim 1, further comprising a reservoir, wherein the first intake passage is in flow communication with the reservoir, and wherein the system is configured such that the quantity of the second fluid expelled from the second chamber is deposited into the reservoir, and such that a combination of the first fluid and the second fluid is drawn from the reservoir via the pump.

34. The system of claim 33, further comprising at least one spray nozzle, wherein the system is configured such that the combination of the first fluid and the second fluid flows to the at least one spray nozzle.

35. The system of claim 1, wherein the second intake passage is configured to be in flow communication with a plurality of fluid sources.

36. The system of claim 35, further comprising a flow control valve between the fluid transfer device and at least one of the plurality of fluid sources in flow communication with the second intake passage.

37. The system of claim 36, further comprising a reservoir, wherein the first intake passage is in flow communication with the reservoir, and wherein the system is configured such that fluid from the two fluid sources in flow communication with the second intake passage is selectively deposited into the reservoir via operation of the fluid transfer device and the flow control valve between the fluid transfer device and at least one of the two fluid sources in flow communication with the second intake passage.

38. A beverage dispensing system comprising:
the system for supplying at least two fluids in proportioned quantities of claim 1; and
a dispensing valve configured to facilitate selective dispensing of a combination of the proportioned quantities of the first fluid and the second fluid.

39. The beverage dispensing system of claim 38, further comprising:
a first coupling between the source of the second fluid and the fluid transfer device;
a second coupling in flow communication with the dispensing valve; and
a sanitizing system comprising,
a container configured to contain a source of sanitizing fluid,
an intake-side passage configured to be removably coupled to the first coupling, and
a dispensing-side passage configured to be removably coupled to the second coupling,
wherein, when the intake-side passage is removably coupled to the first coupling, the system is configured to supply sanitizing fluid via the second intake passage to the fluid transfer device and the dispensing valve.

40. A beverage dispensing system comprising:
the system for supplying at least two fluids in proportioned quantities of claim 1;
a first fluid transfer device configured to provide proportioned quantities of the first fluid and the second fluid;
a second fluid transfer device configured to provide proportioned quantities of the first fluid and a third fluid;
a first dispensing valve configured to facilitate selective dispensing of a combination of the proportioned quantities of the first fluid and the second fluid; and
a second dispensing valve configured to facilitate selective dispensing of a combination of the proportioned quantities of the first fluid and the third fluid.

41. A beverage dispensing system for dispensing at least partially frozen beverages, the beverage dispensing system comprising:
the system for supplying at least two fluids in proportioned quantities of claim 31; and
at least one dispensing valve configured to facilitate selective dispensing of a combination of the proportioned quantities of the first fluid and the second fluid.

42. A fluid misting system comprising:
the system for providing at least two fluids in proportioned quantities of claim 32; and
a plurality of spray nozzles.

43. The fluid misting system of claim 42, further comprising a pesticide concentrate, wherein second fluid comprises the pesticide concentrate.

44. A fluid misting system comprising:
the system for supplying at least two fluids in proportioned quantities of claim 35; and
a plurality of spray nozzles.

45. The fluid misting system of claim 44, further comprising a pesticide concentrate, wherein at least one of the two fluid sources in flow communication with the second intake passage comprises the pesticide concentrate.

46. The fluid misting system of claim 44, further comprising a first pesticide concentrate and a second pesticide concentrate, wherein a first of the two fluid sources in flow communication with the second intake passage comprises the first pesticide concentrate, and a second of the two fluid sources in flow communication with the second intake passage comprises the second pesticide concentrate.

* * * * *